(12) United States Patent
Yano

(10) Patent No.: US 10,404,047 B2
(45) Date of Patent: Sep. 3, 2019

(54) STRUCTURE, WIRING MODULE, AND ELECTRONIC APPARATUS

(71) Applicant: Sony Corporation, Tokyo (JP)

(72) Inventor: Tomoya Yano, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 15/544,901

(22) PCT Filed: Feb. 16, 2016

(86) PCT No.: PCT/JP2016/054409
§ 371 (c)(1),
(2) Date: Jul. 20, 2017

(87) PCT Pub. No.: WO2016/152322
PCT Pub. Date: Sep. 29, 2016

(65) Prior Publication Data
US 2018/0006442 A1    Jan. 4, 2018

(30) Foreign Application Priority Data
Mar. 24, 2015  (JP) .................. 2015-061471

(51) Int. Cl.
*H02G 3/30* (2006.01)
*H02G 3/04* (2006.01)
(Continued)

(52) U.S. Cl.
CPC .................. *H02G 3/30* (2013.01); *G02B 5/04* (2013.01); *G02B 6/4471* (2013.01); *G02B 17/023* (2013.01); *H01B 7/08* (2013.01); *H01B 11/22* (2013.01); *H02G 3/04* (2013.01); *H02G 3/26* (2013.01); *G02B 6/4432* (2013.01)

(58) Field of Classification Search
CPC ...... H01B 7/40; G02B 17/006; G02B 17/004; G02B 17/086; H02G 3/26
See application file for complete search history.

(56) References Cited

U.S. PATENT DOCUMENTS 4,404,425 A * 9/1983 Rich .................... H01B 7/0823
174/107
5,915,980 A * 6/1999 Baldock ............... H01R 25/147
439/120
(Continued)

FOREIGN PATENT DOCUMENTS

CN     102866448 A    1/2013
JP     01197924       8/1989
(Continued)

OTHER PUBLICATIONS

International Search Report from PCT/JP2016/054409, dated Apr. 26, 2016.

*Primary Examiner* — Bradley Duckworth
(74) *Attorney, Agent, or Firm* — Lerner, David, Littenberg, Krumholz & Mentlik, LLP

(57) ABSTRACT

This structure includes a transparent member. The transparent member has a first surface and a second surface arranged to face each other, and allows light entering from the first surface to propagate toward the second surface by reflection. The transparent member has a plurality of slopes inclined with respect to the first surface, in an optical path between the first surface and the second surface.

12 Claims, 8 Drawing Sheets

(51) Int. Cl.
*G02B 6/44* (2006.01)
*H01B 7/08* (2006.01)
*H01B 11/22* (2006.01)
*H02G 3/00* (2006.01)
*G02B 17/02* (2006.01)
*G02B 5/04* (2006.01)

(56) References Cited

U.S. PATENT DOCUMENTS

| | | | |
|---|---|---|---|
| 7,112,746 B2* | 9/2006 | Tsukahara | H02G 3/26 |
| | | | 174/117 F |
| 9,405,118 B1* | 8/2016 | Lu | G02B 27/00 |
| 9,589,702 B2* | 3/2017 | Horii | H01B 7/0823 |
| 2006/0042819 A1 | 3/2006 | Tsukahara et al. | |
| 2009/0090537 A1* | 4/2009 | Nunes | H01B 7/189 |
| | | | 174/135 |
| 2010/0321591 A1 | 12/2010 | Onomatsu | |
| 2012/0292076 A1* | 11/2012 | Shoemaker | H01B 11/1895 |
| | | | 174/107 |
| 2015/0170793 A1 | 6/2015 | Horii et al. | |
| 2017/0010451 A1* | 1/2017 | Naya | G02B 5/04 |

FOREIGN PATENT DOCUMENTS

| | | |
|---|---|---|
| JP | 2002116311 A | 4/2002 |
| JP | 2004200135 A | 7/2004 |
| JP | 2010126889 A | 6/2010 |
| JP | 2011003331 A | 1/2011 |
| JP | 2015194670 A | 11/2015 |
| WO | 2014006996 A1 | 1/2014 |

\* cited by examiner

[ FIG. 1 ]
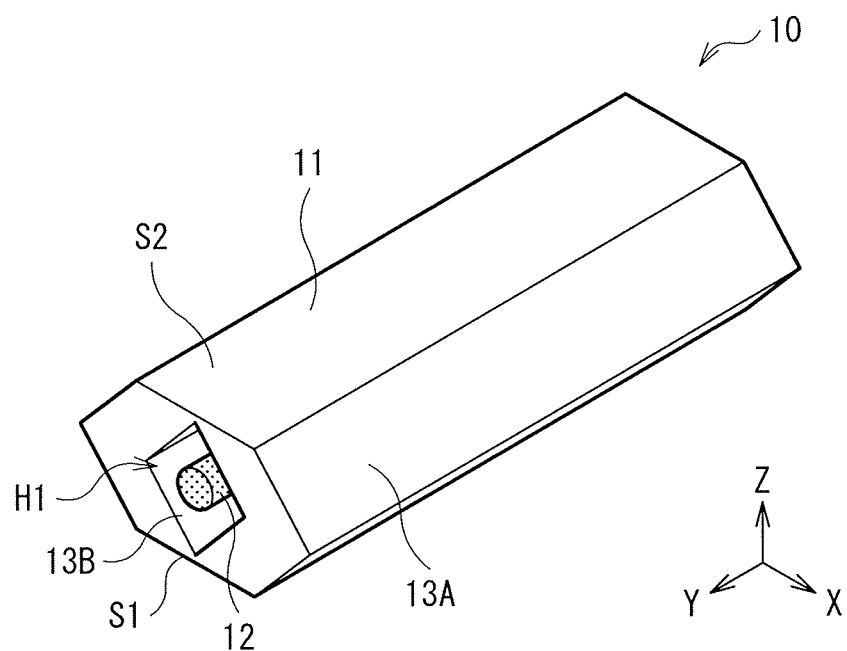
[ FIG. 2 ]
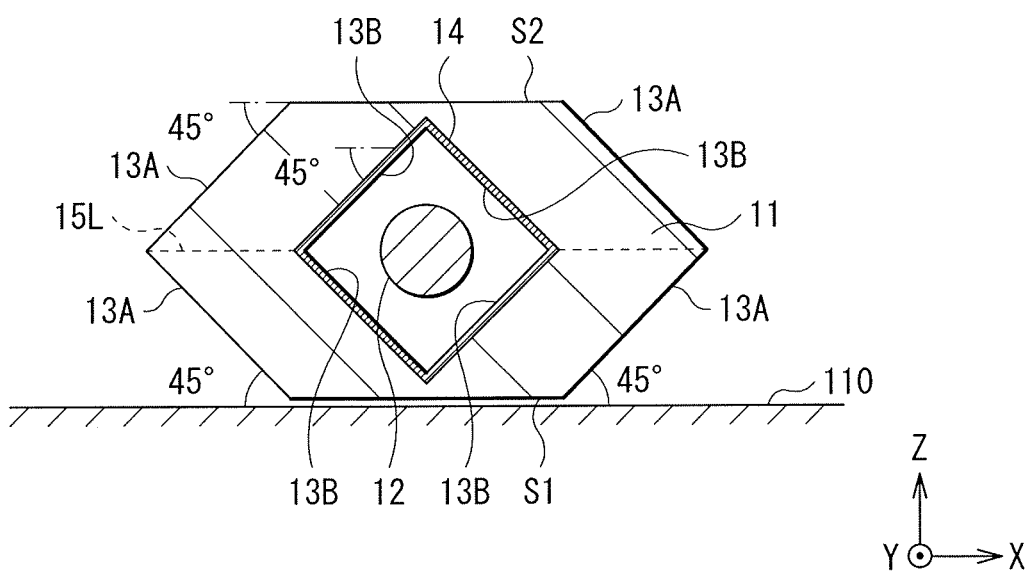

[ FIG. 3 ]
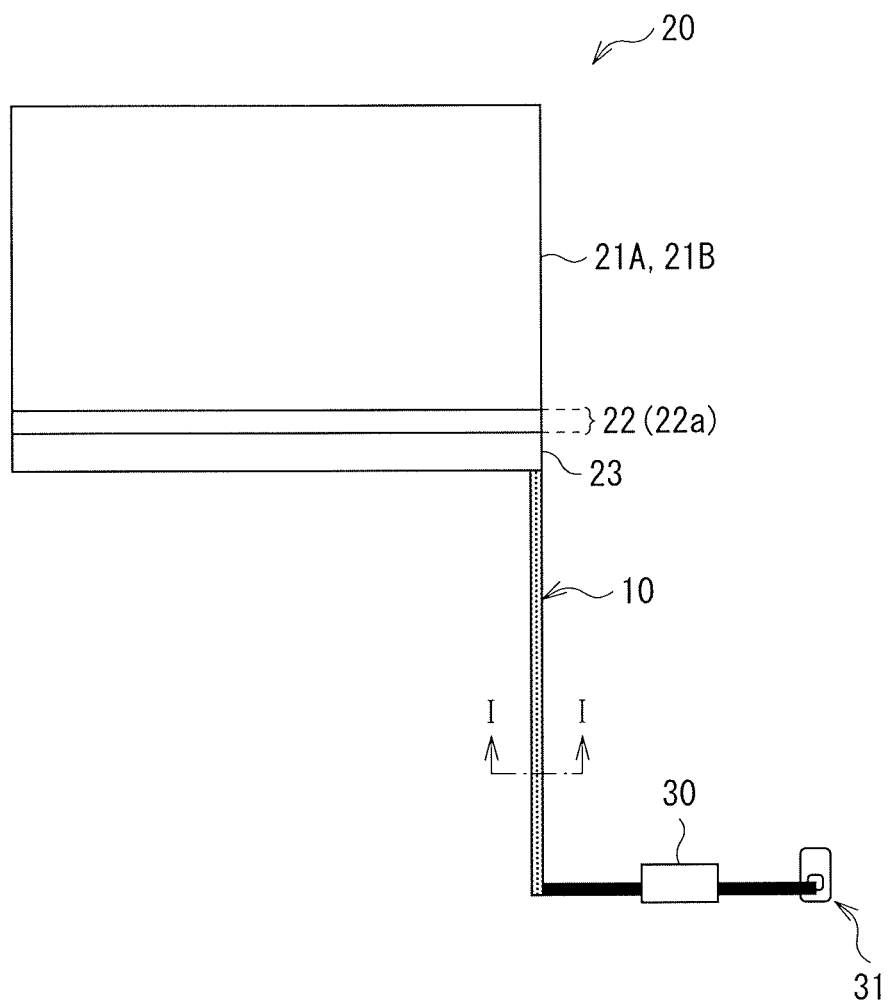

[FIG. 4]
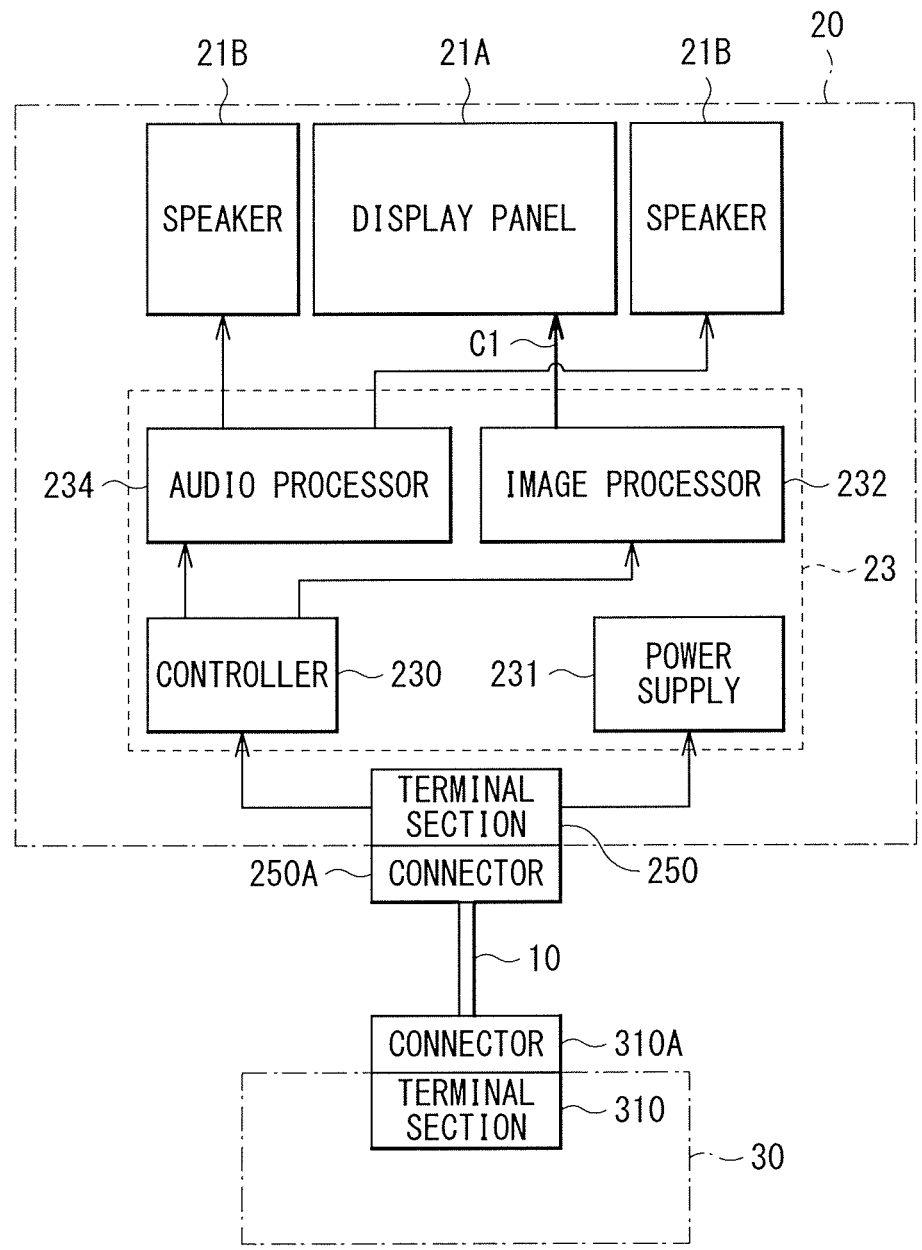

[ FIG. 5 ]
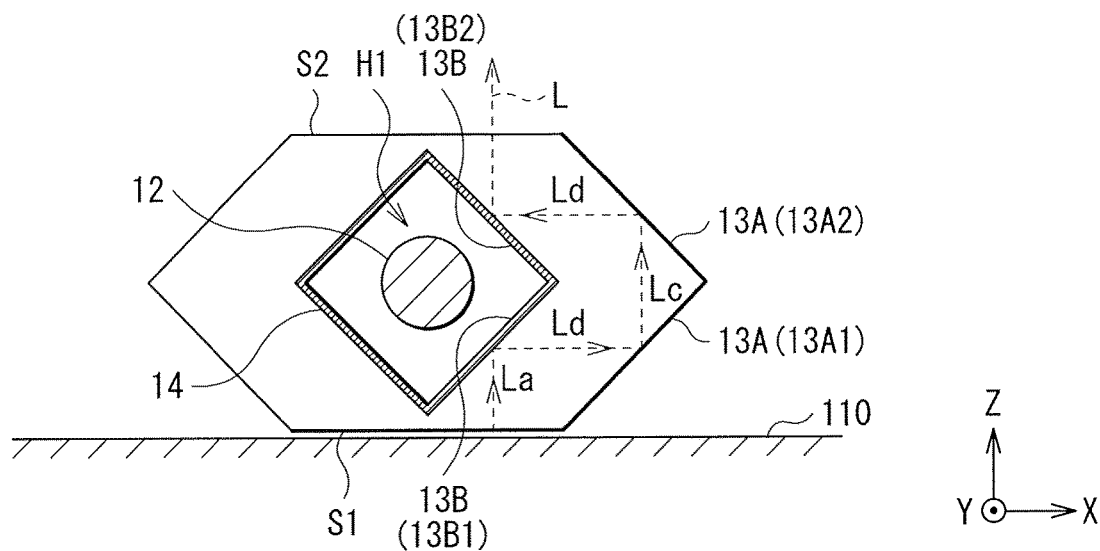
[ FIG. 6 ]
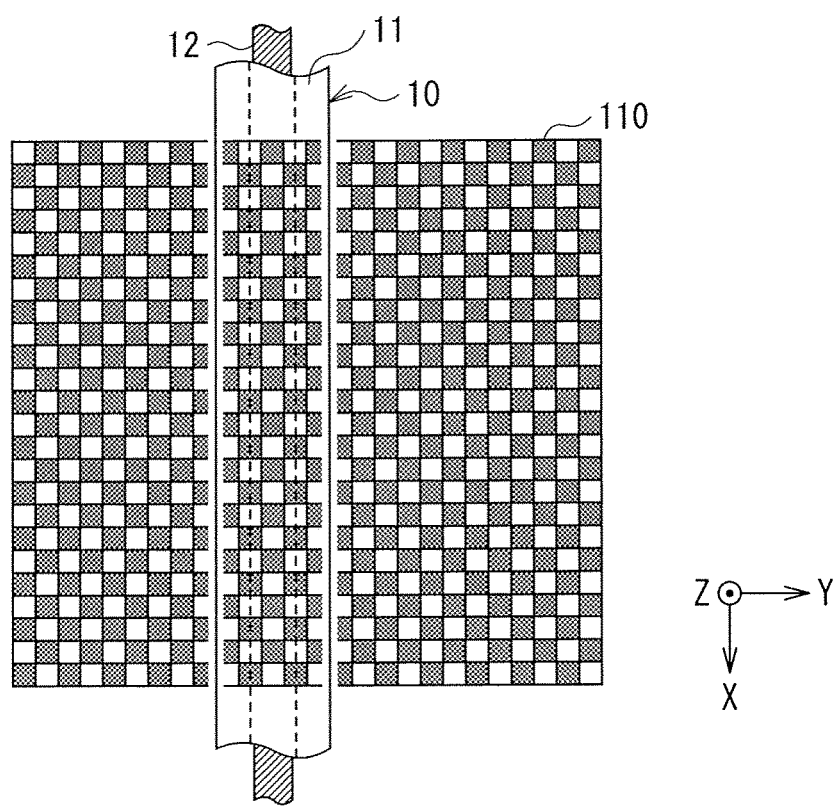

[ FIG. 7 ]
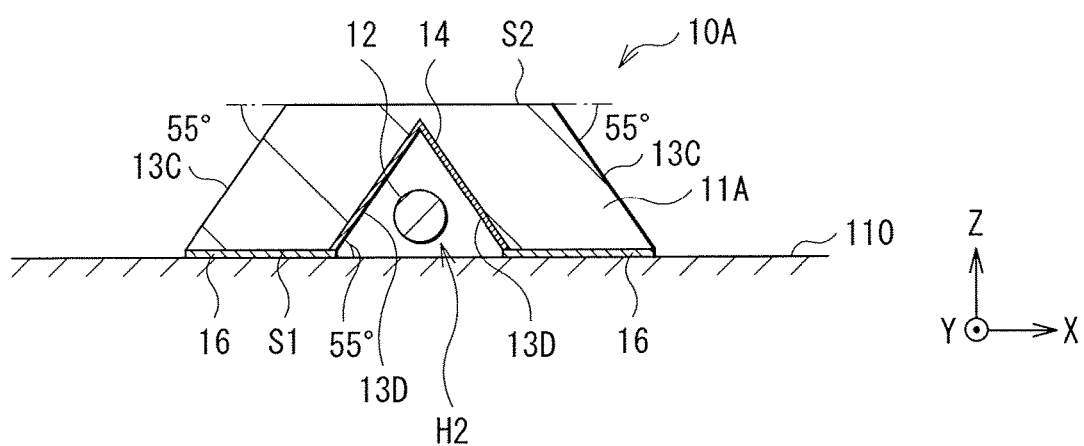
[ FIG. 8 ]
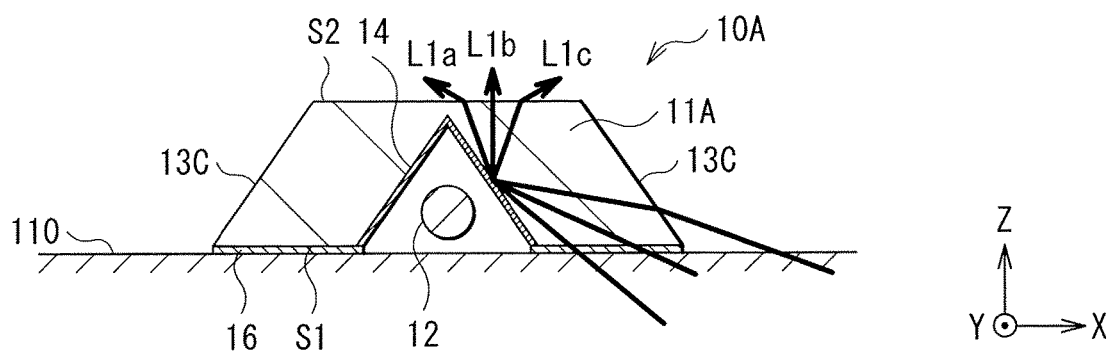

[ FIG. 9 ]
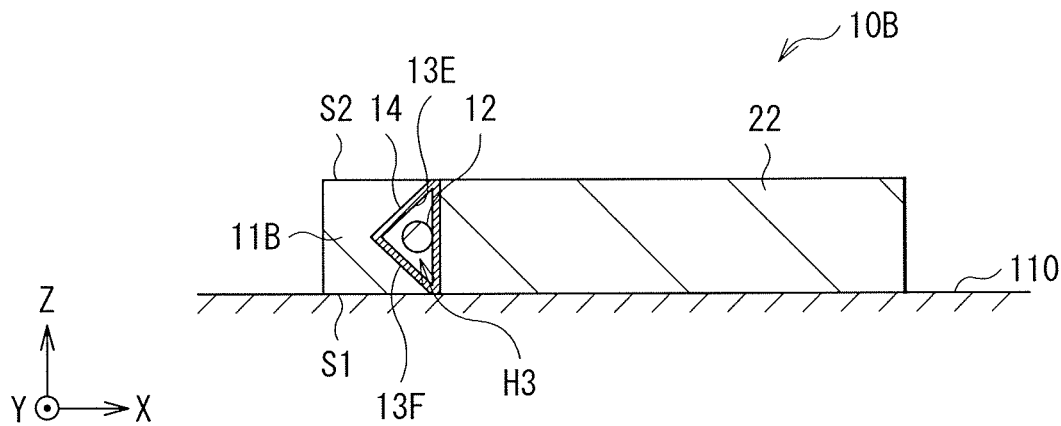
[ FIG. 10 ]
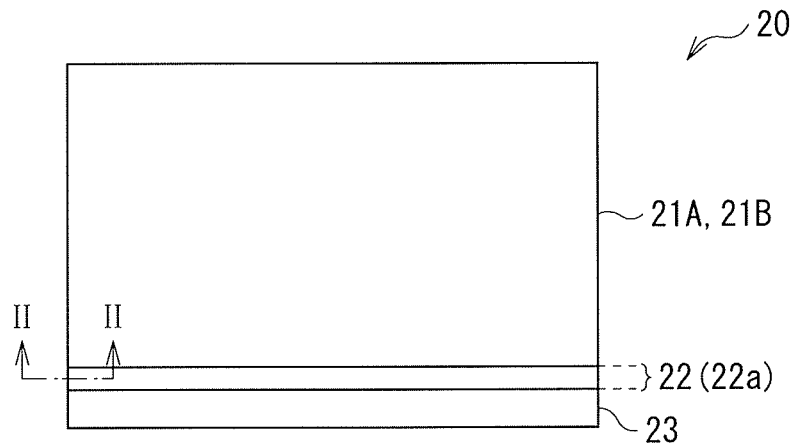
[ FIG. 11 ]
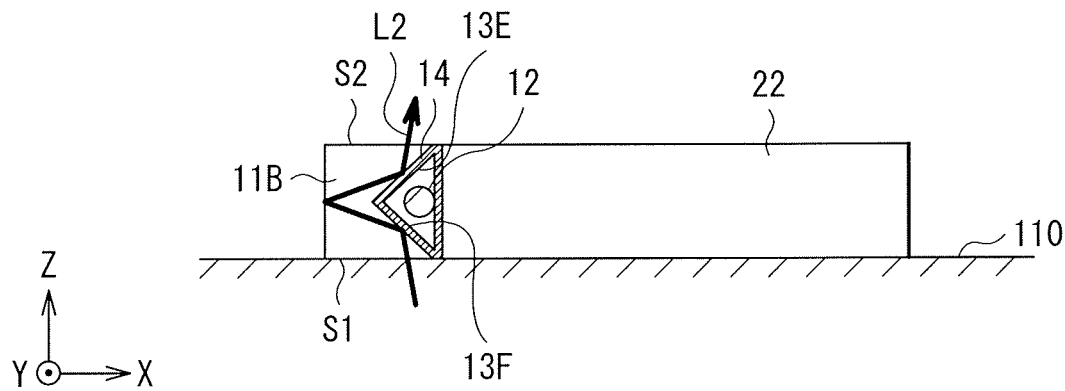

[ FIG. 12 ]
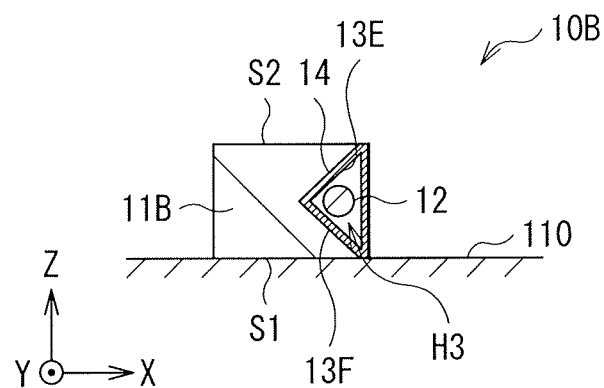
[ FIG. 13 ]
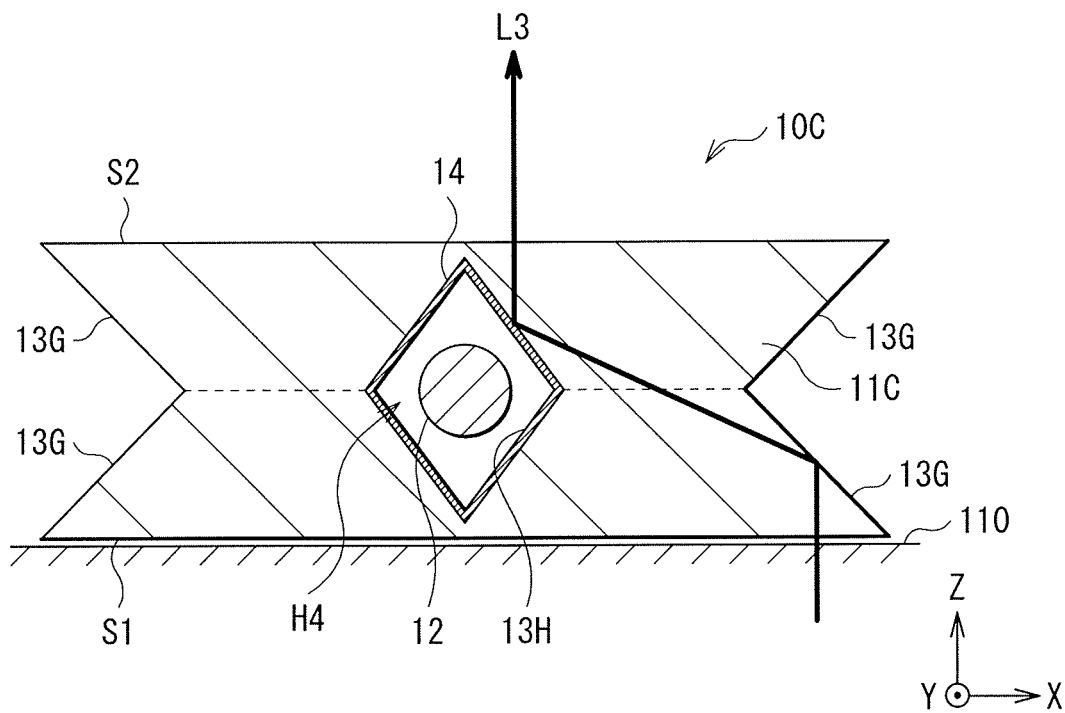

[ FIG. 14 ]
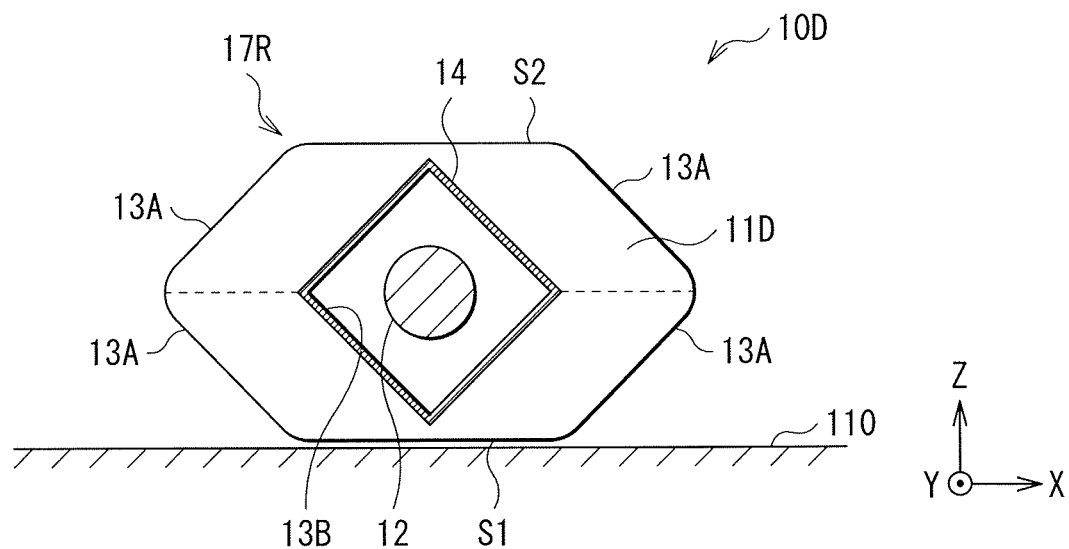
[ FIG. 15 ]
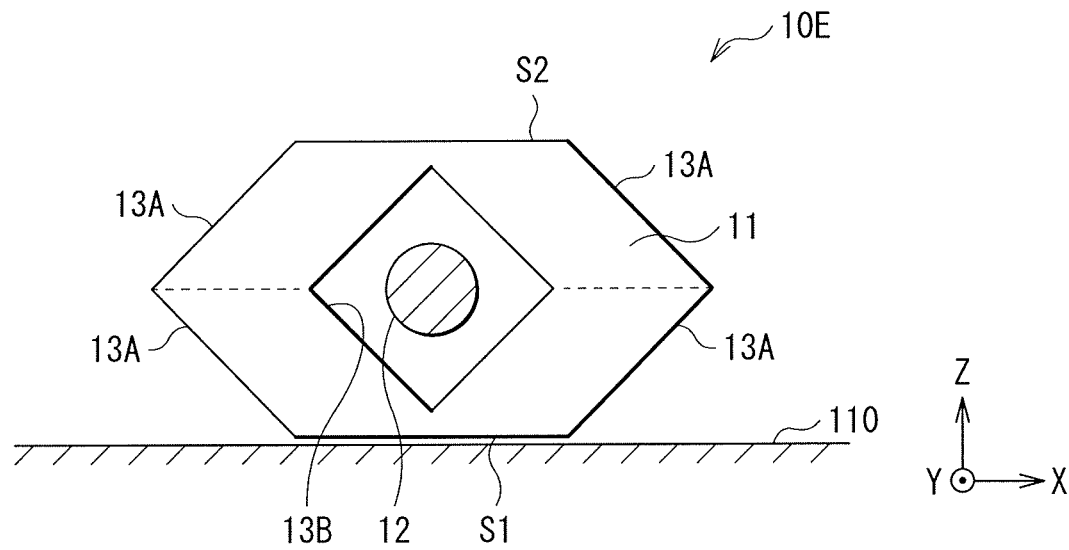

STRUCTURE, WIRING MODULE, AND ELECTRONIC APPARATUS

CROSS-REFERENCE TO RELATED APPLICATIONS

This application is a national phase entry under 35 U.S.C. § 371 of International Application No. PCT/JP2016/054409 filed Feb. 16, 2016, which claims the priority from Japanese Patent Application No. 2015-061471, filed in the Japanese Patent Office on Mar. 24, 2015, the entire contents which are hereby incorporated by reference.

TECHNICAL FIELD

The disclosure relates to a structure used to cover a component such as a wiring line, and to a wiring module as well as an electronic apparatus including the wiring module.

BACKGROUND ART

In a case where, for example, a display apparatus is installed on a wall surface, a wiring line such as a cable for AC power supply is exposed, which is a factor impairing an aesthetic appearance. In this regard, there has been proposed a technique of improving the aesthetic appearance, by covering such a wiring line with a so-called molded member or transparent member (e.g., PTL 1 and PTL 2).

CITATION LIST

Patent Literature

PTL 1: Japanese Unexamined Patent Application Publication No. 2010-126889
PTL 2: WO2014/006996 (A1)

SUMMARY OF INVENTION

However, in a case where a molded member is used as in the above-described PTL 1, it is possible to select a molded member of a color similar to that of a wall surface, but it is difficult to match the color of the molded member with the color or design of the wall surface completely. This therefore becomes a factor impairing an aesthetic appearance. In addition, although it is conceivable that a wiring line may be provided to run inside the wall surface by construction, making a hole is not allowed depending on the material of the wall surface in some cases.

It is therefore desirable to provide a structure, a wiring module, and an electronic apparatus which make it possible to render a wiring line less noticeable upon installation on a surface such as a wall surface.

A structure according to an embodiment of the disclosure includes a transparent member. The transparent member has a first surface and a second surface arranged to face each other, and allows light entering from the first surface to propagate toward the second surface by reflection. The transparent member has a plurality of slopes inclined with respect to the first surface, in an optical path between the first surface and the second surface.

A wiring module according to an embodiment of the disclosure includes the structure according to the above-described embodiment of the disclosure, and a wiring line disposed at one of a position inside the structure and a position on first surface side.

An electronic apparatus according to an embodiment of the disclosure includes the wiring module according to the above-described embodiment of the disclosure. The wiring module electrically couples a plurality of units.

The structure, the wiring module, and the electronic apparatus according to the respective embodiments of the disclosure each include the transparent member that allows the light entering from the first surface to propagate toward the second surface by reflection. The transparent member has the plurality of slopes inclined with respect to the first surface, in the optical path between the first surface and the second surface. Hence, if the structure is observed from second surface side in a state where the first surface is installed on an installation surface such as a wall surface, the installation surface is visually recognized as if the installation surface is seen through the transparent member.

The structure, the wiring module, and the electronic apparatus according to the respective embodiments of the disclosure each include the transparent member that allows the light entering from the first surface to propagate toward the second surface by reflection. The transparent member has the plurality of slopes inclined with respect to the first surface, in the optical path between the first surface and the second surface. It is possible to make the installation surface look as if the installation surface is seen through the transparent member, by performing installation on the installation surface while disposing the wiring line inside such a structure or on first surface side of such a structure. It is therefore possible to make the wiring line less noticeable in the installation on the installation surface such as a wall surface.

It is to be noted that the above-described content is an example of the disclosure. Effects of the disclosure are not limited to those described above, and may be other different effects or may further include other effects.

BRIEF DESCRIPTION OF DRAWINGS

FIG. 1 is a perspective view of a configuration of a wiring module according to an embodiment of the disclosure.

FIG. 2 is an XZ cross-sectional view of a detailed configuration of the wiring module illustrated in FIG. 1.

FIG. 3 is a schematic diagram illustrating an example of an electronic apparatus to which the wiring module illustrated in FIG. 1 is applied.

FIG. 4 is a block diagram illustrating a functional configuration of the electronic apparatus illustrated in FIG. 3.

FIG. 5 is a cross-sectional schematic diagram that describes an effect of the wiring module illustrated in FIG. 1.

FIG. 6 is a schematic diagram that describes an effect of the wiring module illustrated in FIG. 1.

FIG. 7 is a cross-sectional view of a configuration of a wiring module according to Modification Example 1.

FIG. 8 is a cross-sectional schematic diagram that describes an effect of the wiring module illustrated in FIG. 7.

FIG. 9 is a cross-sectional view of a configuration of a wiring module according to Modification Example 2.

FIG. 10 is a schematic diagram that describes an installation location of the wiring module illustrated in FIG. 9.

FIG. 11 is a cross-sectional schematic diagram that describes an effect of the wiring module illustrated in FIG. 9.

FIG. 12 is a cross-sectional view of a configuration of a wiring module according to Modification Example 3.

FIG. 13 is a cross-sectional view of a configuration of a wiring module according to Modification Example 4.

FIG. 14 is a cross-sectional view of a configuration of a wiring module according to Modification Example 5.

FIG. 15 is a cross-sectional view of a configuration of a wiring module according to Modification Example 6.

DESCRIPTION OF EMBODIMENTS

Some embodiments of the disclosure will be described below in detail in the following order, with reference to the drawings.
1. Embodiment (an example of each of a wiring module and an electronic apparatus in which a wiring line is accommodated inside a structure having a hexagonal column shape)
2. Modification Example 1 (an example of a case where a structure having a trapezoidal column shape is used)
3. Modification Example 2 (an example of a wiring module integral with a light-guiding plate)
4. Modification Example 3 (an example of a case where a structure having a quadrangular column shape is used)
5. Modification Example 4 (an example of a case where a structure having two trapezoidal column shapes combined is used)
6. Modification Example 5 (an example of a case where corners of an external shape of a structure is round)
7. Modification Example 6 (an example of a case where no reflective layer is formed)

Embodiment

[Configuration]

FIG. 1 illustrates a configuration of a wiring module (a wiring module 10) according to an embodiment of the disclosure. FIG. 2 illustrates a cross-sectional configuration of this wiring module 10. The wiring module 10 is a module in which a structure (a transparent member 11) accommodates a wiring line 12 (the transparent member 11 covers the wiring line 12).

The transparent member 11 has a first surface S1 and a second surface S2 arranged to face each other. The transparent member 11 allows light entering from the first surface S1 to propagate toward the second surface S2 by causing reflection (total reflection or specular reflection) of the light. This transparent member 1 has, for example, a slim external shape, and has a through-hole H1 that extends in an extending direction (here, a Y direction) thereof. The wiring line 12 is accommodated in the through-hole H1. Examples of a material of such a transparent member 11 include acrylic resin or polymethyl methacrylate resin having a light transmitting property and a refractive index of about 1.5.

The first surface S1 is a surface for installation of the wiring module 10 (the transparent member 11), and is a surface for installation in contact with (or in proximity to) an installation surface (an installation surface 110) or via a transparent adhesive layer. The installation surface 110 is, for example, a wall surface, but is not limited in particular, as long as this is a surface on which a wiring line is installable. Examples of the installation surface 110 include a ceiling, a window, a sash, a floor, and a desk. The second surface S2 is a surface to be disposed on user side (opposite to the installation surface). When the wiring module 10 is observed from the second surface S2 side, the wiring line 12 is hidden so that the installation surface is visually recognized as if the installation surface is seen through. It is desirable that the first surface S1 and the second surface S2 be disposed in parallel with each other, in other words, in parallel with the installation surface 110. This is because a picture on the seen-through installation surface 110 is resistant to warpage so that the picture looks more naturally.

This transparent member 11 has a plurality of (here, four) sets of slopes 13A and 13B arranged to face each other. The slopes 13A each form a portion of the external shape of the transparent member 11, and the slopes 13B each form a portion of the through-hole H1. In the present embodiment, the external shape of the transparent member 11 is a hexagonal column shape including the first surface S1, the second surface S2, and the four slopes 13A. A space surrounded by the four slopes 13B is formed inside the transparent member 11 having the hexagonal column shape, and this space forms the through-hole H1.

The slopes 13A and 13B facing each other are each inclined at an identical angle with respect to the first surface S1. This makes the picture on the seen-through installation surface 110 resistant to warpage, and thus the picture looks more naturally. Here, the slopes 13A and 13B are each inclined at an angle of 45 degrees with respect to the first surface S1. To be more specific, the four slopes 13A are inclined so as to be bilaterally symmetrical at the angle of 45 degrees with respect to the first surface S1. The four slopes 13B are arranged to face the respective four slopes 13A. Here, the four slopes 13B form the through-hole H1 having, for example, a quadrangular column shape. However, the number of sets and the inclination angles of the slopes 13A and 13B are not limited to those exemplified. In addition, the transparent member 11 as well as the slopes 13A and 13B may have no symmetry. There may be such a configuration that light entering from the first surface S1 propagates within the transparent member 11 by total reflection or specular reflection, and exits from the second surface S2.

A reflective layer 14 having a light reflective property is formed on the slopes 13B (adjacent to the slopes 13B) arranged inside the transparent member 11. For example, it is possible to form the reflective layer 14 by applying mirror processing to a side surface (an inner surface) of the through-hole H1. The wiring line 12 is disposed in the through-hole H1 surrounded by the reflective layer 14. It is possible to form such a transparent member 11 by, for example, fabricating two transparent members, each having a trapezoidal column shape, which are separated by a line 15L illustrated in FIG. 2, and by joining the two transparent members to each other.

(Example of Electronic Apparatus)

It is possible to use the above-described wiring module 10 for, for example, a display apparatus as illustrated in FIG. 3 and FIG. 4. It is to be noted that a cross-sectional configuration, which is taken along a line I-I indicated with an arrow in FIG. 3, corresponds to FIG. 2. The display apparatus is a television of a wall-mounted type, and is used in a state of being installed on, for example, a wall surface. This display apparatus has, for example, a display unit 20 and a base unit 30. The wiring module 10 is disposed, as a cable that electrically couples these units, between the display unit 20 and the base unit 30.

The display unit 20 includes, for example, a display panel 21A, a speaker 21B, and an illustrated backlight, and a circuit board 23. The circuit board 23 is, for example, separated from the display panel 21A, and disposed, for example, below the display panel 21A. In this example, a portion of a light-guiding plate 22 is exposed from the display panel 21A (an exposed portion 22a in FIG. 3), in the backlight that illuminates the display panel 21A. A circuit section that drives the display panel 21A and the speaker 21B is formed on the circuit board 23. For example, the circuit board 23 is provided with a controller 230, a power supply 231, an image processor 232, and an audio processor 233.

The base unit 30 generates power as well as signals such as an image signal and an audio signal to be supplied to the display unit 20. The base unit 30 has, inside a housing, for example, components such as a power supply that converts power supplied from an AC power supply 31 into DC power, an input interface that receives a television broadcasting signal, and a tuner section that generates signals such as an image signal and an audio signal.

Connectors 250A and 310A are attached to both ends of the wiring module 10. The wiring module 10 is coupled to a terminal section 250 of the display unit 20 through the connector 250A, and coupled to a terminal section 310 of the base unit 30 through the connector 310A. It is desirable that such a wiring module 10 be fixed to a wall surface by, for example, a transparent adhesive layer. Alternatively, the wiring module 10 may be detachably attached to the wall surface. However, using the adhesive makes an air space less likely to intervene between the first surface S1 and the wall surface (the installation surface 110), thus allowing an image of the seen-through wall surface to look more naturally.

[Workings and Effect]

In the wiring module 10 of the present embodiment, the transparent member 11 has the sets of the slopes 13A and 13B inclined with respect to the first surface S1, in an optical path between the first surface S1 and the second surface S2. The wiring line 12 is accommodated inside (the through-hole H1 which is a space surrounded by the slopes 13B) such a transparent member 11. In the transparent member 11, light entering from the first surface S1 propagates toward the second surface S2 by reflection (total reflection or specular reflection) at the slopes 13A and 13B, and thereafter exits from the second surface S2 (outgoing light L), as illustrated in FIG. 5.

Specifically, in the transparent member 11, a beam (La) entering in a direction (a Z direction) perpendicular to the first surface S1 from the installation surface 110 at backside of the wiring line 12 is reflected by the reflective layer 14 at the slope 13B on lower side (which is denoted as a slope 13B1 for description) in a forward direction of an X direction parallel to the first surface S1. A reflected beam (Lb) is reflected at the slope 13A on lower side (which is denoted as a slope 13A1 for description) in a forward direction of the Z direction. A reflected beam (Lc) is reflected at the slope 13A on upper side (which is denoted as a slope 13A2 for description) in a backward direction of the X direction. A reflected beam (Ld) is reflected by the reflective layer 14 at the slope 13B on upper side in the forward direction of the Z direction, and thereafter exits from the second surface S2. In other words, in a case where the user observes the wiring module 10 from second surface S2 side, the installation surface 110 at backside of the wiring line 12 is visually recognized as if the installation surface 110 is seen through.

In this way, it is possible to provide an appearance that looks as if nothing is placed on the installation surface 110 while hiding the wiring line 12, by providing the predetermined slopes 13A and 13B in the optical path between the first surface S1 and the second surface S2 in the transparent member 11. An image thereof is illustrated in FIG. 6. In this way, for example, in a case where the installation surface 110 has a grid pattern (a grid design), when the wiring module 10 is disposed on the installation surface 110, and the wiring module 10 is viewed from second surface S2 side, the grid design of the installation surface 110 behind the wiring module 10 is seen through, and it looks as if nothing is placed on the installation surface 110. It is therefore possible to make the wiring line 12 less noticeable, upon installation on a surface such as a wall surface. This makes it possible to suppress degradation of an aesthetic appearance due to exposure of a wiring line cable, for example, in a case where a display apparatus is installed on a wall surface.

Further, the external shape of the transparent member 11 is a hexagonal column shape, and the slopes 13A and 13B are each arranged to form an angle of 45 degrees with respect to the first surface S1. This allows the light entering from the direction perpendicular to the first surface S1 to exit in a direction perpendicular to the second surface S2, as described above. Accordingly, warpage is less likely to occur in the image of the seen-through installation surface 110, and a more natural appearance is provided.

In addition, in an electronic apparatus such as a display apparatus, the display panel 21A and the circuit board 23 are separately disposed as illustrated in FIG. 3, which makes it possible to implement reductions in thickness and weight of the display apparatus. In such a case as well, wiring lines such as a power cable and a signal line that couple the display panel 21A and the circuit board 23 are exposed, which impairs the aesthetic appearance. However, it is possible to implement reductions in thickness and weight without impairing the aesthetic appearance, by using the wiring module 10 described above, as a wiring line cable that couples the display panel 21A and the circuit board 23.

In the present embodiment, as described above, the transparent member 11, which allows the light entering from the first surface S1 to propagate toward the second surface S2 by reflection, has the sets of the slopes 13A and 13B inclined with respect to the first surface S1, in the optical path between the first surface S1 and the second surface S2. It is possible to make the installation surface 110 look as if the installation surface 110 is seen through the transparent member 11, by installing the wiring module 10 on the installation surface 110, in a state where the wiring line 12 is accommodated inside (the through-hole H1) such a transparent member 11. It is therefore possible to make a wiring line less noticeable, upon installation on a surface such as a wall surface.

Modification examples of the above-described embodiment are described below. It is to be noted that the same components as those of the above-described embodiment are provided with the same reference numerals as those of the above-described embodiment, and description thereof is omitted where appropriate.

Modification Example 1

FIG. 7 illustrates a cross-sectional configuration of a wiring module (a wiring module 10A) according to Modification Example 1. As with the wiring module 10 of the above-described embodiment, the wiring module 10A is a module in which a structure (a transparent member 11A) accommodates the wiring line 12 (the transparent member 11A covers the wiring line 12). In addition, the wiring module 10A is applicable to an electronic apparatus such as the display apparatus having the display unit 20 and the base unit 30 described in the above-described embodiment.

The transparent member 11A has the first surface S1 and the second surface S2 arranged to face each other, and allows light entering from the first surface S1 to propagate toward the second surface S2 by reflection (total reflection or specular reflection). This transparent member 11A has, for example, a slim external shape, and has a concave H2 that extends in an extending direction (a Y direction) thereof. The wiring line 12 is accommodated in the concave H2. Examples of a material of this transparent member 11A include acrylic resin or polymethyl methacrylate resin having a light transmitting property and a refractive index of about 1.5, as with the transparent member 11 of the above-described embodiment. It is desirable that a transparent adhesive layer 16 be formed between the first surface S1 of this transparent member 11A and the installation surface 110, in order to reduce an air interface, and in order to make it easy to take a beam from the first surface S1 into the transparent member 11A.

This transparent member 11A has a plurality of (here, two) sets of slopes (slopes 13C and 13D) facing each other. The slopes 13C each form a portion of the external shape of the transparent member 11A, and the slopes 13D each form a portion of the concave H2. In the present modification example, the external shape of the transparent member 11A is a trapezoidal column shape including the first surface S1, the second surface S2, and the two slopes 13C. On first surface S1 side of the transparent member 11A having the trapezoidal column shape, a space surrounded by the two slopes 13D is formed, and this space forms the concave H2.

The slopes 13C and 13D facing each other are inclined at an identical angle with respect to the first surface S1. This makes a picture on the seen-through installation surface 110 resistant to warpage, and thus the picture looks more naturally. Here, the slopes 13C and 13D are each inclined at an angle of 45 degrees or more (e.g., 55 degrees) with respect to the first surface S1. To be more specific, the two slopes 13C are inclined so as to be bilaterally symmetrical at the angle of 55 degrees with respect to the first surface S1. The two slopes 13D are arranged to face the respective two slopes 13C, and form the concave H2 having, here, for example, a triangular column shape. The reflective layer 14 is formed on the slope 13D (adjacent to the slope 13D). The wiring line 12 is disposed inside the concave H2 surrounded by the reflective layer 14.

In the wiring module 10A of the present modification example, the transparent member 11A has the sets of the slopes 13C and 13D inclined with respect to the first surface S1, in the optical path between the first surface S1 and the second surface S2. The wiring line 12 is accommodated on first surface S1 side (in the concave H2, which is a space surrounded by the slopes 13D) of such a transparent member 11A. In the transparent member 11A, as illustrated in FIG. 8, light entering from the first surface S1 propagates toward the second surface S2 by reflection (total reflection or specular reflection) at the slopes 13C and 13D, and exits from the second surface S2 (outgoing beams L1a, L1b, and L1c). In other words, in a case where the user observes the wiring module 10A from second surface S2 side, the installation surface 110 at backside of the wiring line 12 looks as if the installation surface 110 is seen through. In this way, it is possible to provide an appearance that looks as if nothing is placed on the installation surface 110 while hiding the wiring line 12. It is therefore possible to obtain an effect substantially equal to that of the above-described embodiment.

Moreover, in the present modification example, the slopes 13C and 13D are each inclined to form the angle of 45 degrees or more with respect to the first surface S1. This increases a range corresponding to a viewing angle, and it is therefore possible to make the wiring line 12 less noticeable, even in a case where the wiring module 10A is viewed from an oblique direction.

Modification Example 2

FIG. 9 illustrates a cross-sectional configuration of a wiring module (a wiring module 10B) according to Modification Example 2. The wiring module 10B is a module in which a structure (a transparent member 11B) accommodates the wiring line 12 (the transparent member 11B covers the wiring line 12), as with the wiring module 10 of the above-described embodiment. In addition, the wiring module 10B is applicable to an electronic apparatus such as the display apparatus having the display unit 20 and the base unit 30 described in the above-described embodiment. However, in the wiring module 10B of the present modification example, the transparent member 11B is disposed integrally with the light-guiding plate 22. Specifically, the transparent member 11B has substantially the same thickness as that of the light-guiding plate 22, and is disposed adjacent to the light-guiding plate 22.

The transparent member 11B has the first surface S1 and the second surface S2 arranged to face each other, and allows light entering from the first surface S1 to propagate toward the second surface S2 by reflection (total reflection or specular reflection). This transparent member 11B has, for example, a slim external shape, and has one of a through-hole and a concave that extend in an extending direction (a Y direction) thereof. Here, a concave H3 is formed on a side surface (a surface adjacent to the light-guiding plate 22) of the transparent member 11B. The wiring line 12 is accommodated in this concave H3. Examples of a material of this transparent member 11B include acrylic resin or polymethyl methacrylate resin having a light transmitting property and a refractive index of about 1.5, as with the transparent member 11 of the above-described embodiment.

This transparent member 11B has one set of slopes (slopes 13E and 13F) inclined with respect to the first surface S1. The slopes 13E and 13F form a portion of the concave H3. In the present modification example, the external shape of the transparent member 11B is a quadrangular column shape including the first surface S1 and the second surface S2. The concave H3, which is a space surrounded by the slopes 13E and 13F, is formed inside the quadrangular column shape.

The slopes 13E and 13F are each inclined, for example, at an angle of 45 degrees or more with respect to the first surface S1. The reflective layer 14 is formed on these slopes 13E and 13F (adjacent to the slopes 13E and 13F). The reflective layer 14 is also formed on a side surface of the light-guiding plate 22 facing the concave H3. The wiring line 12 is disposed inside the concave H3 surrounded by the reflective layer 14.

The wiring module 10B of the present modification example is particularly effective in a case where a portion (the exposed portion 22a) of the light-guiding plate 22 is exposed from the display panel 21A, in the backlight of the display panel 21A, and the circuit board 23 is disposed separately from the display panel 21A, as illustrated in, for example, FIG. 10. The circuit board 23 is disposed separately from the display panel 21A, with the exposed portion 22a of the light-guiding plate 22 interposed therebetween. It is to be noted that a cross-sectional configuration taken along a line II-II indicated with an arrow in FIG. 10 corresponds to FIG. 9. Providing the wiring module 10B adjacent to (integrally with) the exposed portion 22a of the light-guiding plate 22 allows a wiring line cable (a wiring line corresponding to a line C1 in FIG. 4), which couples the display panel 21A (or the speaker 21B) and the circuit board 23, to be disposed unnoticeable, thus making it possible to suppress degradation of an aesthetic appearance.

In this way, in the present modification example as well, the transparent member 11B has the set of the slopes 13E and 13F each inclined with respect to the first surface S1, in the optical path between the first surface S1 and the second surface S2. The wiring line 12 is accommodated in the concave H3 of such a transparent member 11B. In the transparent member 11B, as illustrated in FIG. 11, light entering from the first surface S1 propagates toward the second surface S2 by reflection (total reflection or specular reflection) at the slopes 13E and 13F and a side surface of the transparent member 11B, and exits from the second surface S2 (outgoing light L2). In other words, in a case where the user observes the wiring module 10A from second surface S2 side, the installation surface 110 at backside of the wiring line 12 looks as if the installation surface 110 is seen through. In this way, it is possible to provide an appearance that looks as if nothing is placed on the installation surface 110 while hiding the wiring line 12. It is therefore possible to obtain an effect substantially equal to that of the above-described embodiment.

Modification Example 3

FIG. 12 illustrates a cross-sectional configuration of the wiring module 10B according to Modification Example 3. In the above-described Modification Example 2, the configuration in which the wiring module 10B is disposed adjacent to the light-guiding plate is described; however, this wiring module 10B may be used alone, as illustrated FIG. 12.

Modification Example 4

FIG. 13 illustrates a cross-sectional configuration of a wiring module (a wiring module 10C) according to Modification Example 4. The wiring module 10C is a module in which a structure (a transparent member 11C) accommodates the wiring line 12 (the transparent member 11C covers the wiring line 12), as with the wiring module 10 of the above-described embodiment. In addition, the wiring module 10C is applicable to a wiring line cable of an electronic apparatus such as the display apparatus having the display unit 20 and the base unit 30 described in the above-described embodiment.

The transparent member 11C has the first surface S1 and the second surface S2 arranged to face each other, and allows light entering from the first surface S1 to propagate toward the second surface S2 by reflection (total reflection or specular reflection). This transparent member 11C has, for example, a slim external shape, and has a through-hole H4 that extends in an extending direction (a Y direction) thereof. The wiring line 12 is accommodated in the through-hole H4. Examples of a material of this transparent member 11C include acrylic resin or polymethyl methacrylate resin having a light transmitting property and a refractive index of about 1.5, as with the transparent member 11 of the above-described embodiment.

This transparent member 11C has a plurality of (here, four) sets of slopes (slopes 13G and 13H) facing each another. The slopes 13G each form a portion of the external shape of the transparent member 11C, and the slopes 13H each form a portion of the through-hole H4. In the present modification example, the transparent member 11C has a trapezoidal column shape including the first surface S1 and the two slopes 13G, and a trapezoidal column shape including the second surface S2 and the two slopes 13G. The external shape of the transparent member 11C is formed by joining upper bases of the respective trapezoidal column shapes to each other. A space surrounded by the four slopes 13H is formed inside such a transparent member 11C, and this space forms the through-hole H4.

The slopes 13G and 13H are each inclined at an angle of 45 degrees or more with respect to the first surface S1. The reflective layer 14 is formed on the slopes 13H (adjacent to the slopes 13H). The wiring line 12 is disposed inside the through-hole H4 surrounded by the reflective layer 14.

In the wiring module 10C of the present modification example, the transparent member 11C has the sets of the slopes 13G and 13H each inclined with respect to the first surface S1, in the optical path between the first surface S1 and the second surface S2. The wiring line 12 is accommodated inside (the through-hole H4 which is a space surrounded by the slopes 13H) such a transparent member 11A. In the transparent member 11C, as illustrated in FIG. 13, light entering from the first surface S1 propagates toward the second surface S2 by reflection (total reflection or specular reflection) at the slopes 13G and 13H, and exits from the second surface S2 (outgoing light L3). In other words, in a case where the user observes the wiring module 10C from second surface S2 side, the installation surface 110 at backside of the wiring line 12 looks as if the installation surface 110 is seen through. In this way, it is possible to provide an appearance that looks as if nothing is placed on the installation surface 110 while hiding the wiring line 12. It is therefore possible to obtain an effect substantially equal to that of the above-described embodiment.

Modification Example 5

FIG. 14 illustrates a cross-sectional configuration of a wiring module (a wiring module 10D) according to Modification Example 5. As in the present modification example, corners of an external shape of a transparent member (a transparent member 11D) may be round. Specifically, in the transparent member 11D with a hexagonal column shape having slopes 13A and 13B similar to those of the transparent member 11 of the above-described embodiment, each corner 17R is round. In this way, making the corner 17R round suppresses damage that occurs in a case where a person or object hits the corner 17R.

Modification Example 6

FIG. 15 illustrates a cross-sectional configuration of a wiring module (a wiring module 10E) according to Modification Example 6. In the above-described embodiment and the modification examples, the case where the reflective layer 14 is formed on the inner slopes is described as an example. However, as in the present modification example, the reflective layer 14 may not be necessarily formed. In other words, it is possible to make the installation surface 110 at backside of the wiring line 12 look as if the installation surface 110 is seen through, by allowing light to propagate from the first surface S1 to the second surface S2 by total reflection caused by the slopes 13A and 13B, without depending on specular reflection. However, as in the above-described embodiment, the case where the reflective layer 14 is provided is more desirable, because the wiring line 12 is less likely to be visually recognized.

The disclosure is described above using the embodiment and the modification examples, but the disclosure is not limited to the above-described embodiment and the modification examples, and various modifications may be made. For example, the material of each of the members described in the above-described embodiment and the modification examples is not limitative, and other materials may be adopted.

In addition, the external shape of the transparent member, the number of the slopes, and the inclination angles of the slopes in the disclosure are not limited to the examples described in the above-described embodiment and the modification examples, and various modifications may be made. Moreover, although the case where the first slope forming the external shape of the transparent member and the second slope facing the first slope are inclined at the identical angle is described as an example in the above-described embodiment and the modification examples, the inclination angles of the first slope and the second slope may be different from each other. However, when the inclination angles are identical, the seen-through installation surface is more resistant to warpage and looks more naturally.

Furthermore, in the above-described embodiment and the modification examples, the display apparatus is described as an example of the electronic apparatus; however, the electronic apparatus of the disclosure is not limited to the display apparatus. The electronic apparatus of the disclosure is also applicable to, for example, other electronic apparatuses such as audiovisual equipment.

It is to be noted that the effects described herein are mere examples without being limitative, and other effects may also be provided. In addition, the technology may adopt the following configurations.

(1) A structure including:
    a transparent member that has a first surface and a second surface arranged to face each other, and allows light entering from the first surface to propagate toward the second surface by reflection, the transparent member having a plurality of slopes inclined with respect to the first surface, in an optical path between the first surface and the second surface.
(2) The structure according to (1), in which the plurality of slopes include a set of a first slope and a second slope facing each other.
(3) The structure according to (2), in which
    the transparent member with a slim external shape has one of a through-hole and a concave that extend in an extending direction of the transparent member,
    the first slope forms a portion of the external shape of the transparent member, and
    the second slope forms a portion of one of the through-hole and the concave.
(4) The structure according to (3), further including a light reflection layer on the second slope.
(5) The structure according to any one of (1) to (4), in which the first surface includes a surface for installation.
(6) The structure according to (5), further including a transparent adhesive layer formed on the first surface.
(7) The structure according to (2), in which the first slope and the second slope facing each other have an identical inclination angle with respect to the first surface.
(8) The structure according to any one of (3) to (7), in which
    four sets of the first slope and the second slope are provided,
    the external shape of the transparent member is a hexagonal column shape including the first surface, the second surface, and the four first slopes, and
    the through-hole is formed by a space surrounded by four second slopes inside the hexagonal column shape.
(9) The structure according to (8), in which the first slope and the second slope each have an inclination angle of 45 degrees with respect to the first surface.
(10) The structure according to any one of (3) to (7), in which
    two sets of the first slope and the second slope are provided,
    the external shape of the transparent member is a trapezoidal column shape including the first surface, the second surface, and the two first slopes, and
    the concave is formed by a space surrounded by the two second slopes on first surface side of the trapezoidal column shape.
(11) The structure according to (10), in which the first slope and the second slope each have an inclination angle of 45 degrees or more with respect to the first surface.
(12) The structure according to (2), in which
    the transparent member with a slim external shape has one of a through-hole and a concave that extend in an extending direction of the transparent member,
    one set of the first slope and the second slope is provided,
    the external shape of the transparent member is a quadrangular column shape including the first surface and the second surface, and
    one of the through-hole and the concave is formed by a space surrounded by the first slope and the second slope.
(13) The structure according to (3), in which
    four sets of the first slope and the second slope are provided,
    the transparent member has an external shape including a first trapezoidal column shape and a second trapezoidal column shape, the first trapezoidal column shape including the first surface and two of the first slopes, the second trapezoidal column shape including the second surface and two of the first slopes, the first trapezoidal column shape and the second trapezoidal column shape having respective upper bases that are joined to each other to form the external shape, and
    the through-hole is formed by a space surrounded by the four second slopes.
(14) The structure according to any one of (3) to (13), in which
    the external shape of the transparent member includes a plurality of corners, and
    each of the plurality of corners is round.
(15) A wiring module including:
    a structure including a transparent member that has a first surface and a second surface arranged to face each other, and allows light entering from the first surface to propagate toward the second surface by reflection; and
    a wiring line disposed at one of a position inside the structure and a position on first surface side of the structure, in which
    the transparent member has a plurality of slopes inclined with respect to the first surface, in an optical path between the first surface and the second surface.
(16) The wiring module according to (15), in which the plurality of slopes include a set of a first slope and a second slope facing each other.
(17) The wiring module according to (16), in which
    the transparent member with a slim external shape has one of a through-hole and a concave that extend in an extending direction of the transparent member,
    the first slope forms a portion of the external shape of the transparent member,
    the second slope forms a portion of one of the through-hole and the concave, and
    the wiring line is accommodated inside the one of the through-hole and the concave.

(18) An electronic apparatus including:
a wiring module that electrically couples a plurality of units, the wiring module including
a structure including a transparent member that has a first surface and a second surface arranged to face each other, and allows light entering from the first surface to propagate toward the second surface by reflection, and
a wiring line disposed at one of a position inside the structure and a position on first surface side of the structure, in which
the transparent member has a plurality of slopes inclined with respect to the first surface, in an optical path between the first surface and the second surface.

(19) The electronic apparatus according to (18), further including:
a display unit including a display panel; and
a base unit that generates power and an image signal that are to be supplied to the display unit, in which
the wiring module is disposed between the display unit and the base unit.

(20) The electronic apparatus according to claim 18, in which
the display unit includes
a circuit board on which a circuit section that drives the display panel is formed, and
a light-guiding plate that guides illumination light toward the display panel,
the light-guiding plate includes a part exposed from the display panel,
the circuit board is disposed separately from the display panel, with the exposed part of the light-guiding plate interposed therebetween, and
the wiring module is disposed adjacent to the exposed part of the light-guiding plate, between the display panel and the circuit board.

This application is based upon and claims the benefit of priority of the Japanese Patent Application No. 2015-061471 filed with the Japan Patent Office on Mar. 24, 2015, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A structure comprising:
a transparent member that has a first surface and a second surface arranged to face each other, and allows light entering from the first surface to propagate toward the second surface by reflection, the transparent member having a plurality of slopes inclined with respect to the first surface in an optical path between the first surface and the second surface,
wherein the plurality of slopes include a first slope and a second slope facing each other, the transparent member comprising an external shape comprising one of a through-hole and a concave that extends in an extending direction of the transparent member, the external shape of the transparent member is a quadrangular column shape including the first surface and the second surface, and one of the through-hole and the concave is formed by a space surrounded by the first slope and the second slope.

2. The structure according to claim 1, wherein
the first and second slopes each form a portion of one of the through-hole and the concave.

3. The structure according to claim 2, further comprising a light reflection layer on the second slope.

4. The structure according to claim 1, wherein the first surface comprises a surface for installation.

5. The structure according to claim 4, further comprising a transparent adhesive layer formed on the first surface.

6. The structure according to claim 1, wherein the first slope and the second slope facing each other have an identical inclination angle with respect to the first surface.

7. The structure according to claim 1, wherein the first slope and the second slope each have an inclination angle of 45 degrees with respect to the first surface.

8. A wiring module comprising:
a structure including a transparent member that has a first surface and a second surface arranged to face each other, and allows light entering from the first surface to propagate toward the second surface by reflection; and
a wiring line disposed at one of a position inside the structure and a position on first surface side of the structure, wherein
the transparent member has a plurality of slopes inclined with respect to the first surface, in an optical path between the first surface and the second surface, the plurality of slopes include a first slope and a second slope facing each other, the transparent member comprising an external shape comprising one of a through-hole and a concave that extends in an extending direction of the transparent member, the external shape of the transparent member is a quadrangular column shape including the first surface and the second surface, and one of the through-hole and the concave is formed by a space surrounded by the first slope and the second slope.

9. The wiring module according to claim 8, wherein
the second slope forms a portion of one of the through-hole and the concave, and
the wiring line is accommodated inside the one of the through-hole and the concave.

10. An electronic apparatus comprising:
a wiring module that electrically couples a plurality of units, the wiring module including
a structure including a transparent member that has a first surface and a second surface arranged to face each other, and allows light entering from the first surface to propagate toward the second surface by reflection, and
a wiring line disposed at one of a position inside the structure and a position on first surface side of the structure, wherein
the transparent member has a plurality of slopes inclined with respect to the first surface, in an optical path between the first surface and the second surface, the plurality of slopes include a first slope and a second slope facing each other, the transparent member comprising an external shape comprising one of a through-hole and a concave that extends in an extending direction of the transparent member, the external shape of the transparent member is a quadrangular column shape including the first surface and the second surface, and one of the through-hole and the concave is formed by a space surrounded by the first slope and the second slope.

11. The electronic apparatus according to claim 10, further comprising:
a display unit including a display panel; and
a base unit that generates power and an image signal that are to be supplied to the display unit, wherein the wiring module is disposed between the display unit and the base unit.

12. The electronic apparatus according to claim 11, wherein the display unit includes a circuit board on which a circuit section that drives the display panel is formed, and a light-guiding plate that guides illumination light toward the display panel, the light-guiding plate includes a part exposed from the display panel, the circuit board is disposed separately from the display panel, with the exposed part of the light-guiding plate interposed therebetween, and the wiring module is disposed adjacent to the exposed part of the light-guiding plate, between the display panel and the circuit board.

* * * * *